S. H. KEEFER & G. E. GREENLEAF.
M. A. KEEFER, ADMINISTRATRIX OF S. H. KEEFER, DEC'D.
MACHINE TOOL.
APPLICATION FILED MAY 26, 1913. RENEWED APR. 15, 1918.

1,299,192.

Patented Apr. 1, 1919.
10 SHEETS—SHEET 1.

WITNESSES:
John J. Kittel
Jesse A. Hollow

INVENTOR
BY
ATTORNEYS

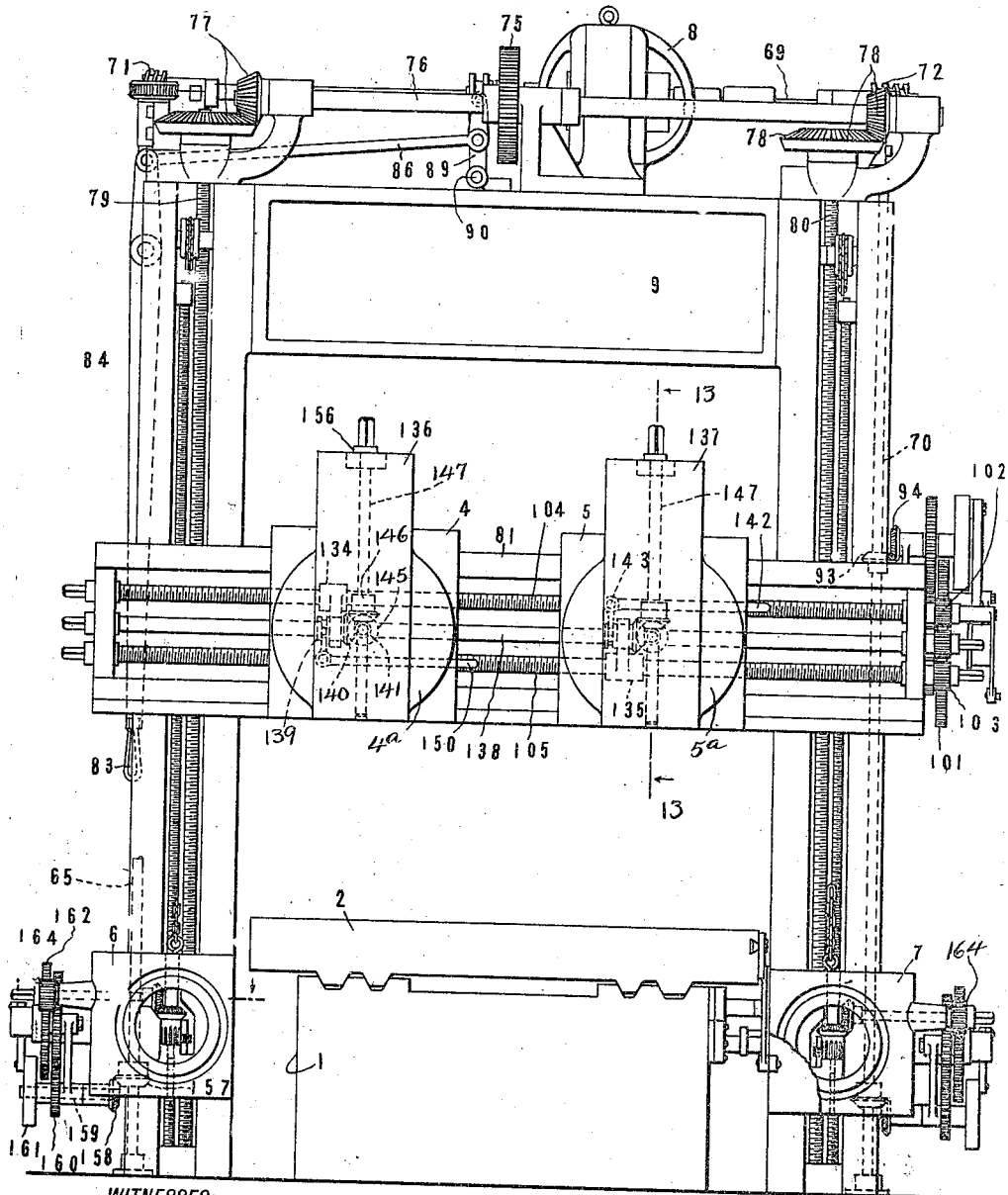

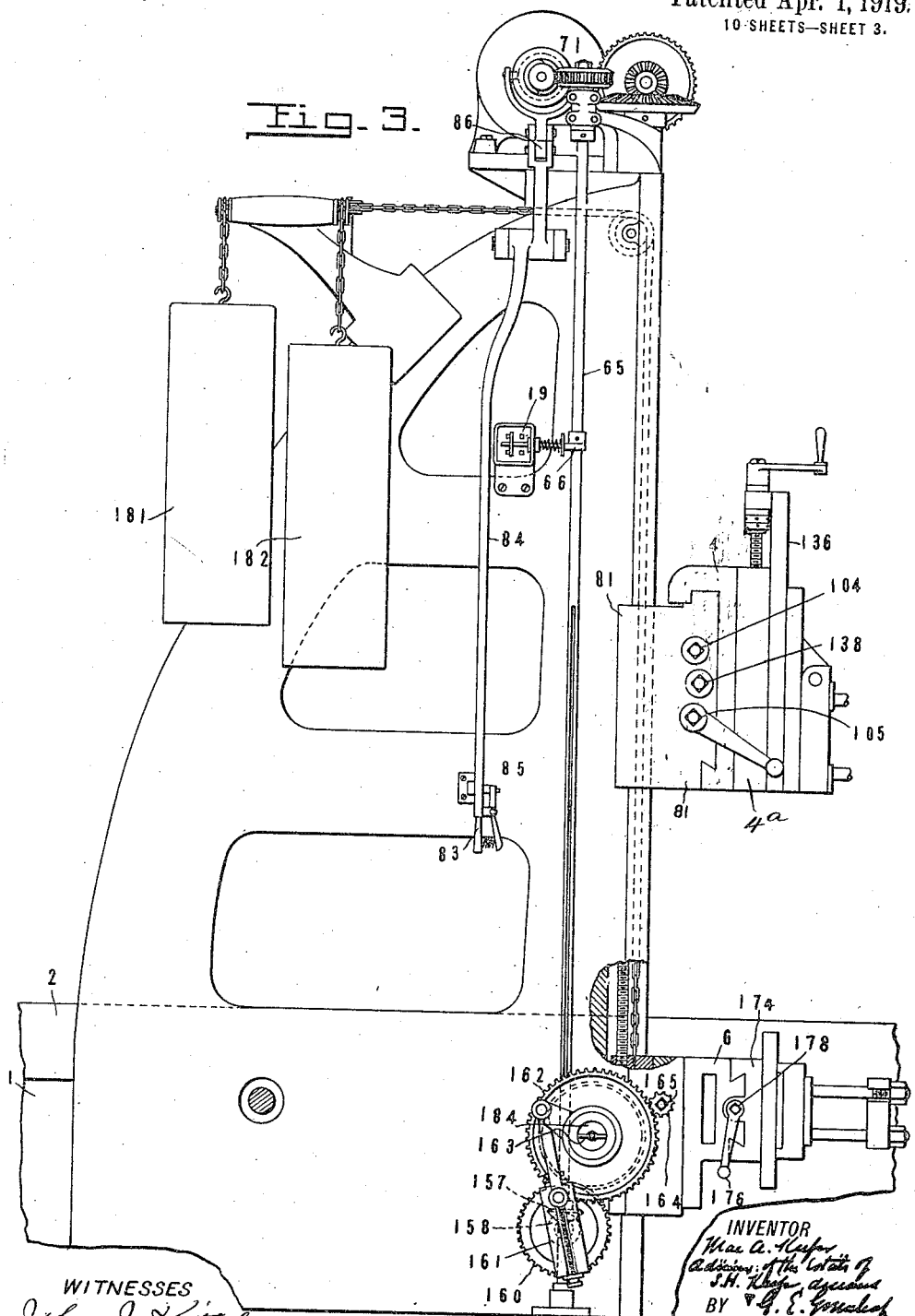

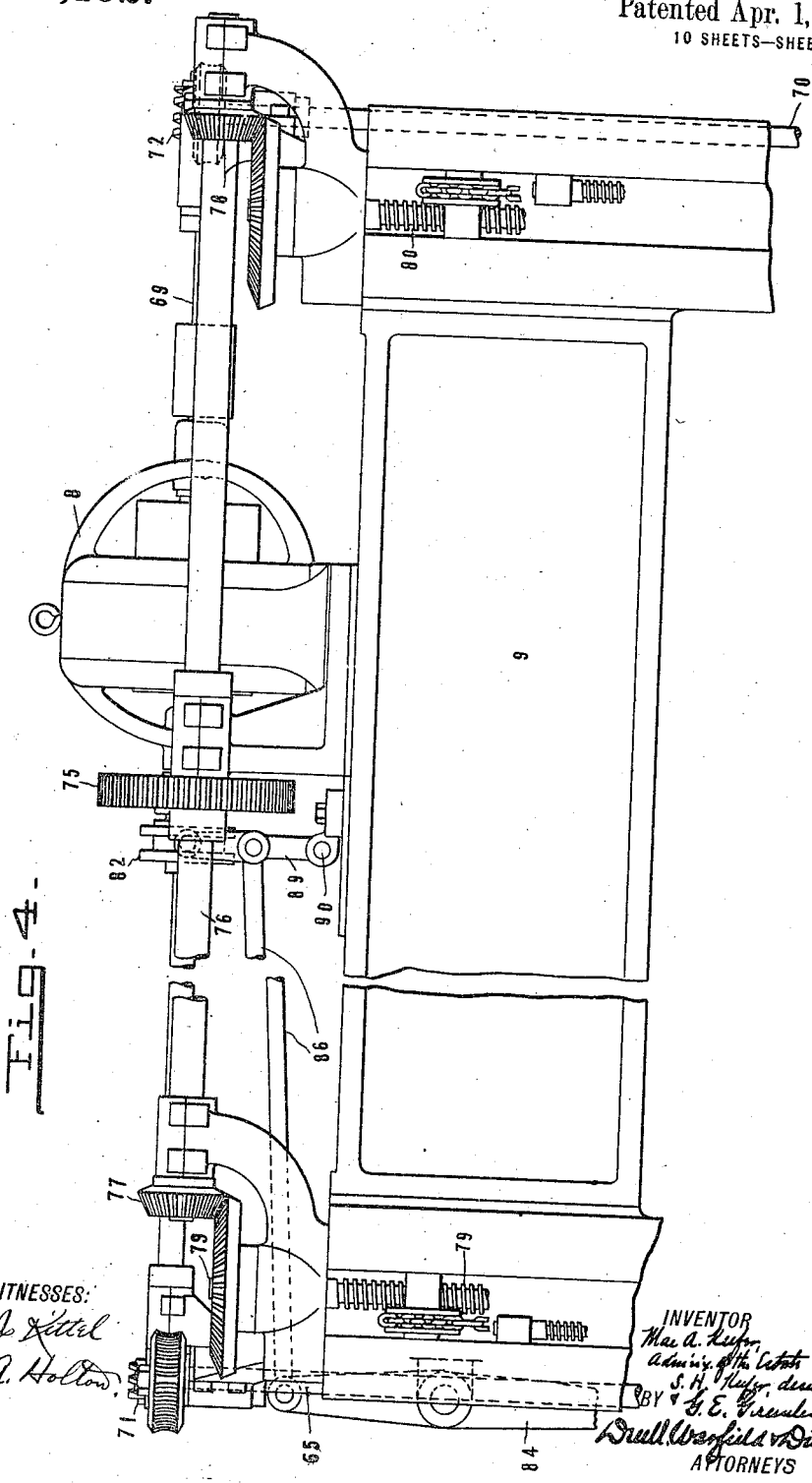

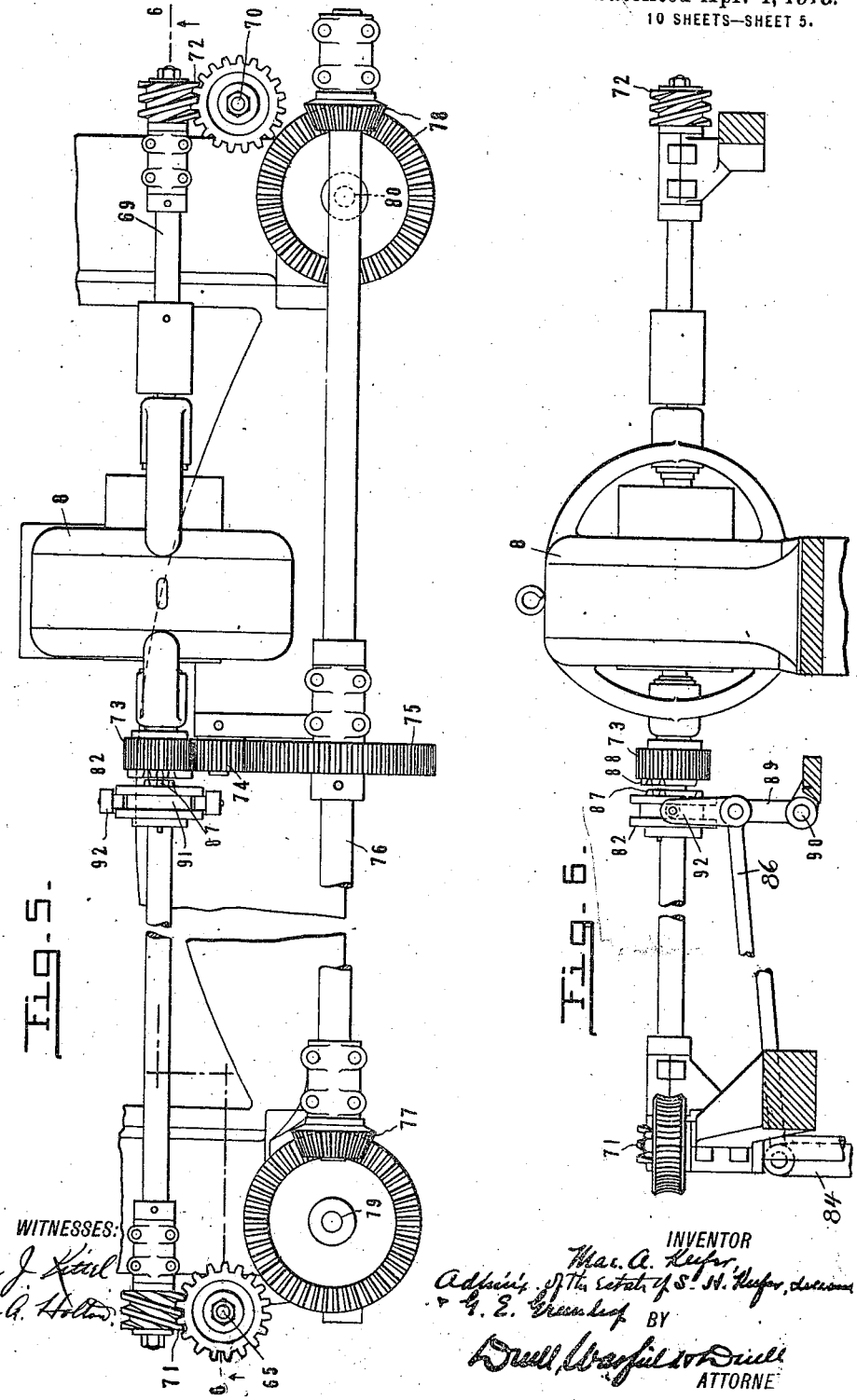

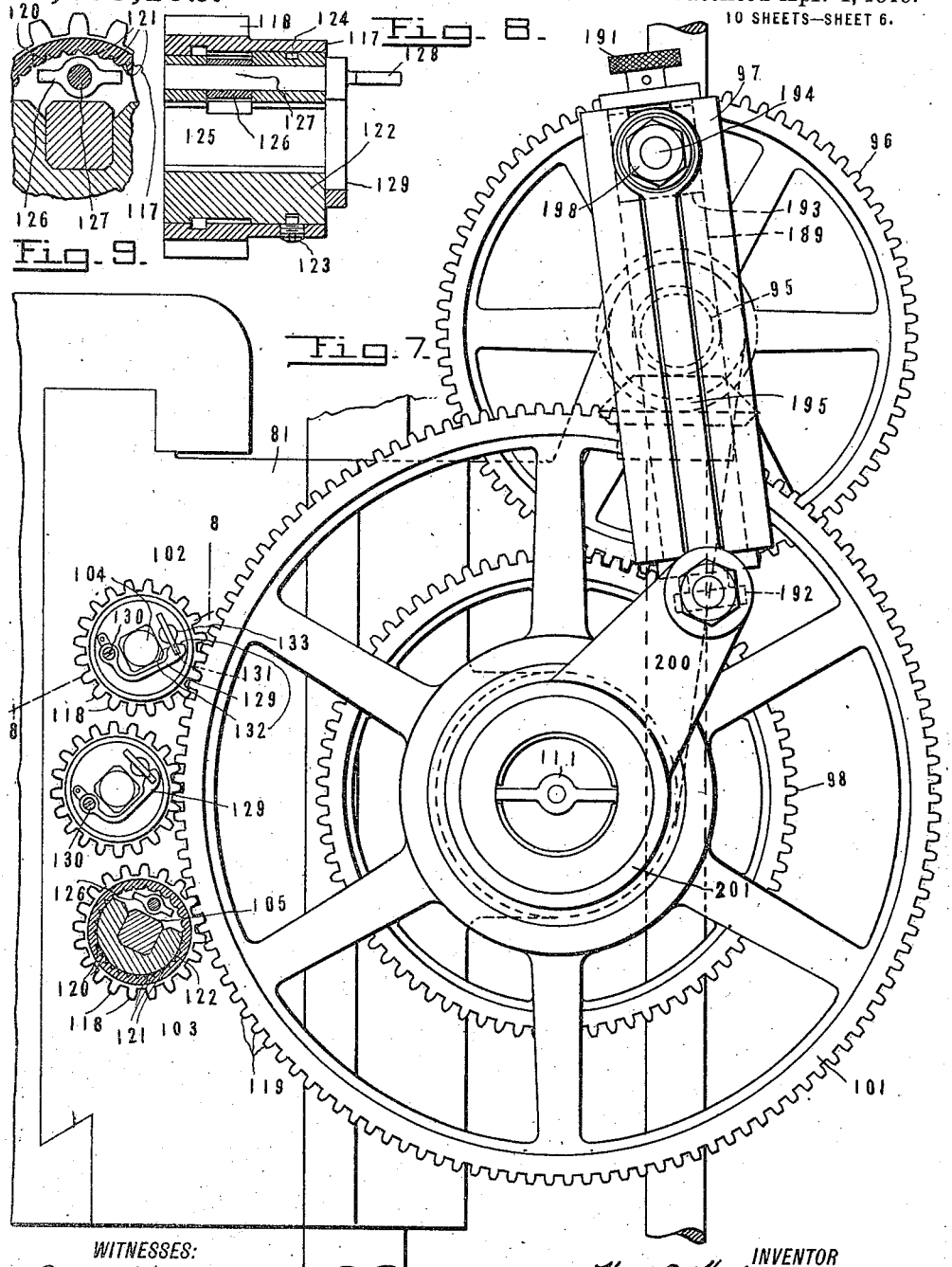

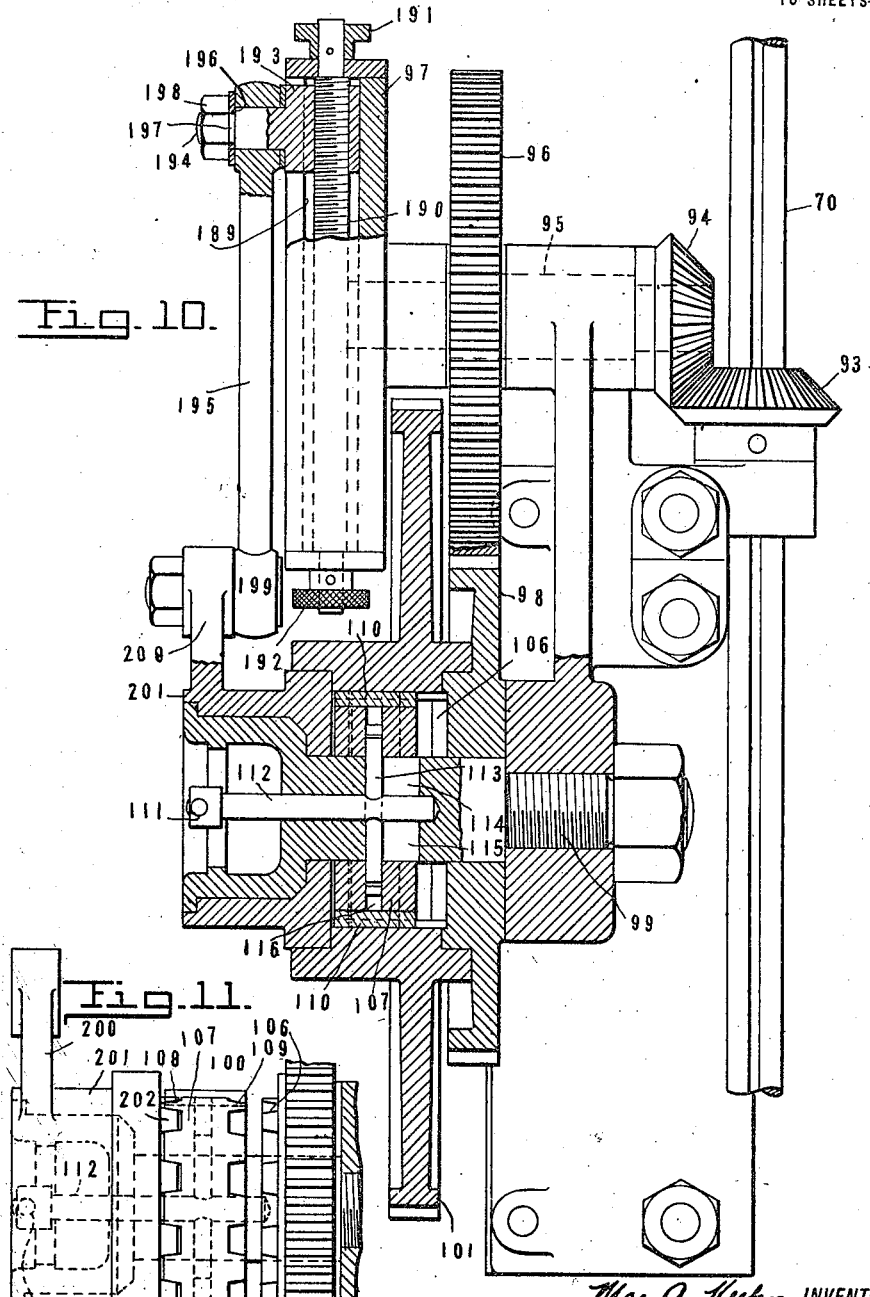

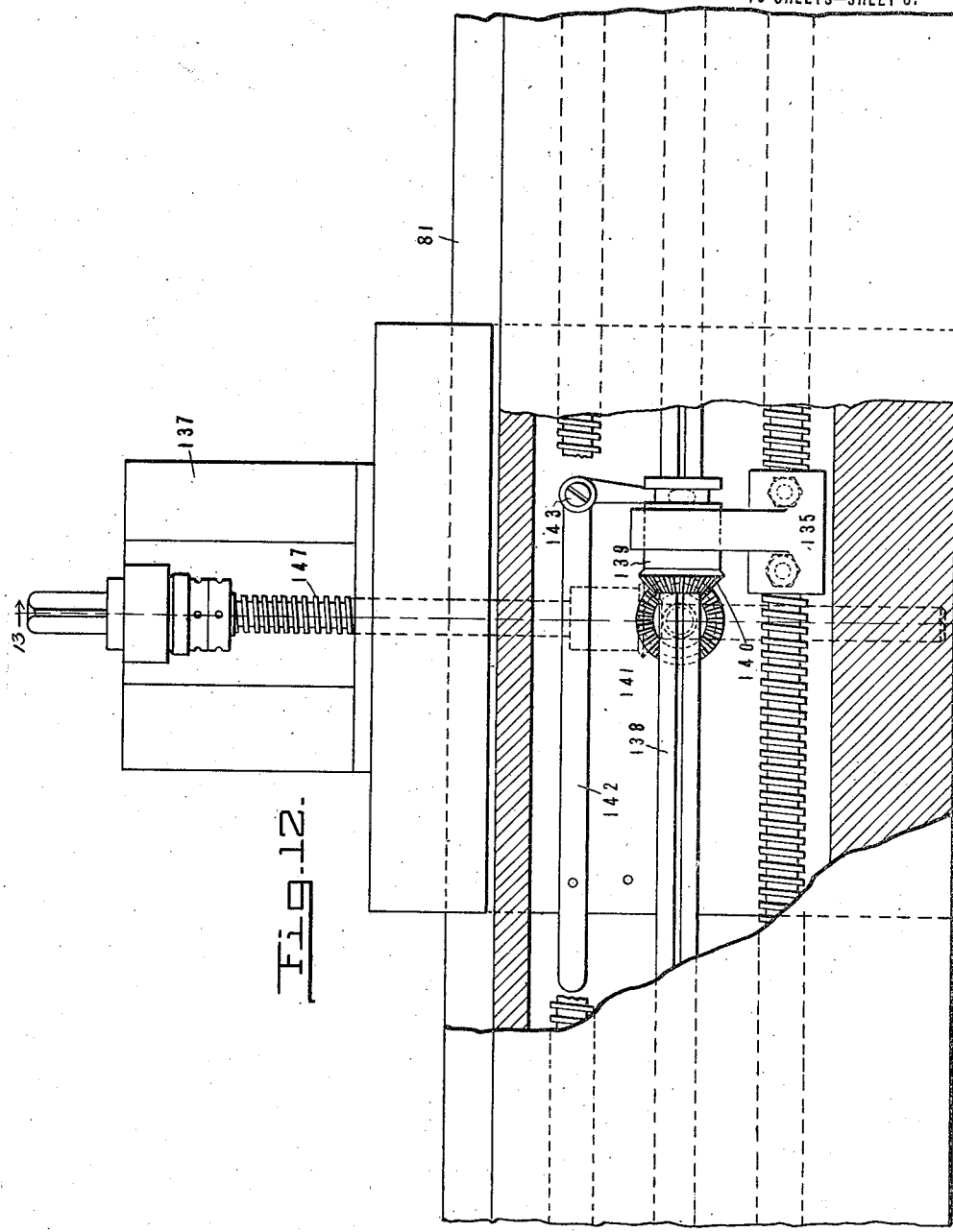

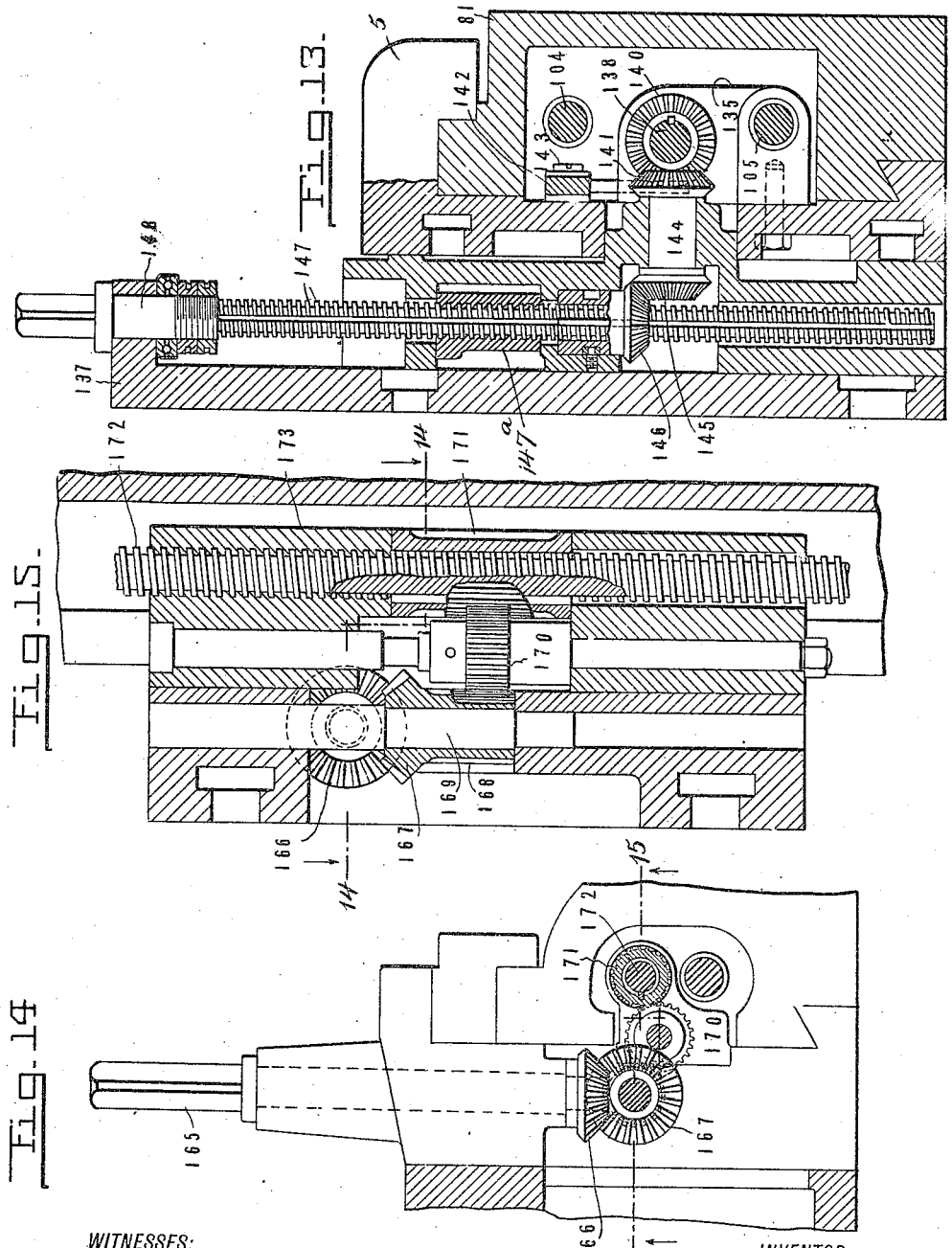

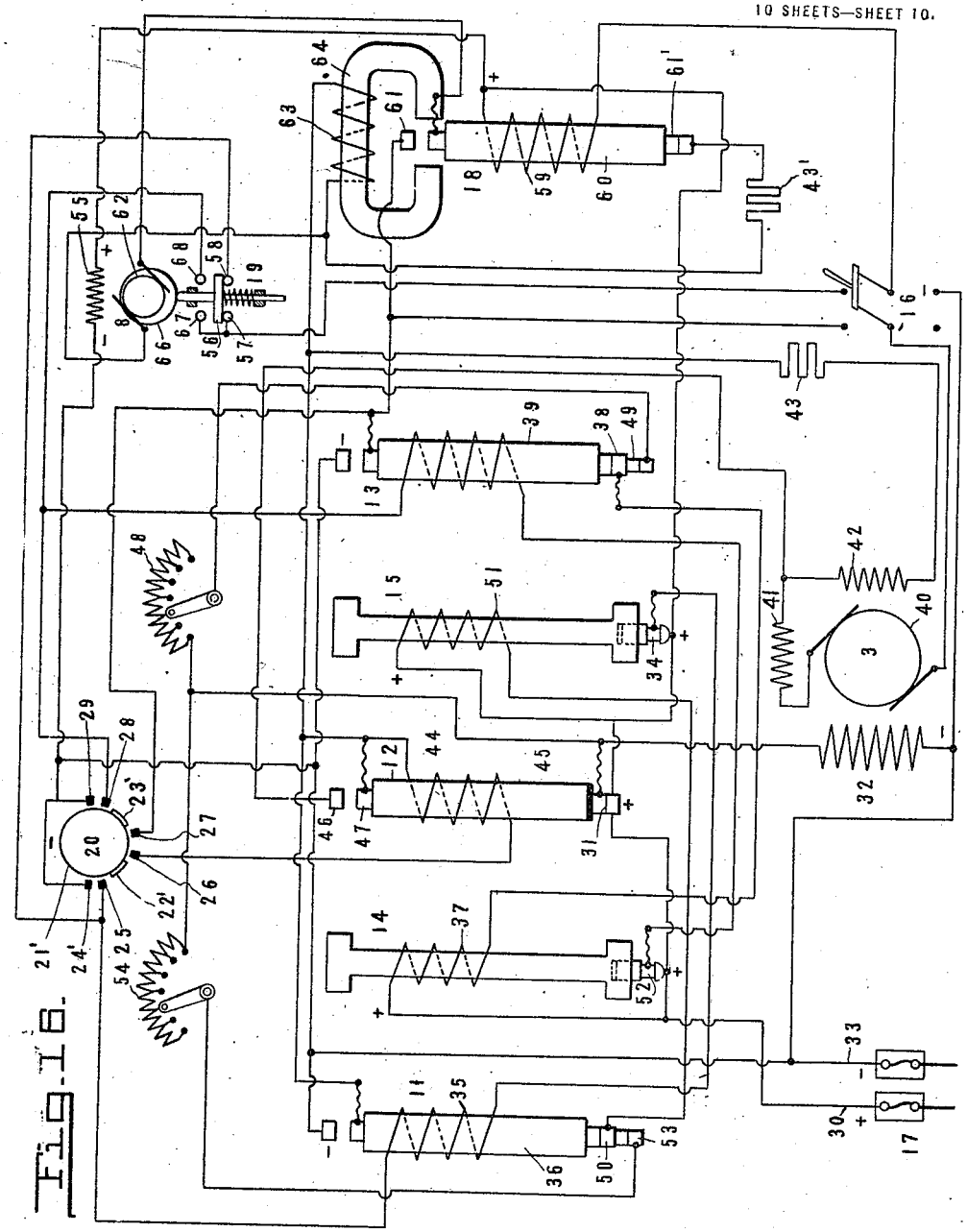

UNITED STATES PATENT OFFICE.

SAMUEL H. KEEFER, DECEASED, LATE OF PLAINFIELD, NEW JERSEY, BY MAE A. KEEFER, ADMINISTRATRIX, OF PLAINFIELD, NEW JERSEY, AND GEORGE E. GREENLEAF, OF PLAINFIELD, NEW JERSEY, ASSIGNORS TO NILES-BEMENT-POND COMPANY, OF JERSEY CITY, NEW JERSEY, A CORPORATION OF NEW JERSEY.

MACHINE-TOOL.

1,299,192.     Specification of Letters Patent.     Patented Apr. 1, 1919.

Application filed May 26, 1913, Serial No. 769,859. Renewed April 15, 1918. Serial No. 228,809.

*To all whom it may concern:*

Be it known that SAMUEL H. KEEFER, formerly a citizen of the United States, residing in Plainfield, Union county, New Jersey, but now deceased, did during his lifetime, in collaboration with GEORGE E. GREENLEAF, a citizen of the United States, residing at Plainfield, Union county, New Jersey, invent certain new and useful Improvements in Machine-Tools, of which the following is a specification.

The invention relates particularly to machine tools of the class in which each is provided with a movable table or bed to which the work is secured, and with one or more cutting tools adapted to be fed transversely of the lines of travel of the table and of the work. The invention is particularly adapted for use in connection with a machine having a vertically adjustable horizontal cross-rail which is supported above the moving table, and having one or more tool-carrying heads horizontally adjustable on the cross-rail. We have illustrated and will describe a planer as an example of a machine of this class, but it will be understood that the invention, as concerns certain phases thereof, is not limited to planers.

One of the objects of the invention is to provide an improved arrangement of parts whereby a single power means, preferably an electric motor, may be utilized either to move the cutting tool continuously for preliminary adjustments or intermittently for feeding. Another object of the invention is to provide improved means whereby the electric feed-motor may be automatically stopped after moving the tool to a predetermined extent, and means whereby the stopping means may be rendered inoperative to prevent continuous movement of the tool. A further object of the invention is to provide improved electrical devices for controlling not only the feed-motor but also another motor which may be provided for driving the movable table.

Other objects will be apparent from the following specification and claims.

The invention accordingly consists in the features of construction, combinations of elements and arrangement of parts which will be exemplified in the construction hereinafter set forth, and the scope of the application of which will be indicated in the following claims.

Referring now to the accompanying drawings, in which are shown one of various possible embodiments of the several features of the invention,—

Fig. 2 is a front end elevation on a larger scale, parts of the tool heads being omitted for the sake of clearness;

Fig. 3 is a fragmentary left side elevation on a still larger scale;

Fig. 4 is an enlarged front elevation of the feed-motor and parts of the gearing connected therewith;

Fig. 5 is a plan view of the parts shown in Fig. 4;

Fig. 6 is a fragmentary elevational view partly in section along the line 6—6 of Fig. 5;

Fig. 7 is an enlarged detail view taken from the right side of the planer and showing parts of the feeding and adjusting mechanism for the cross heads;

Fig. 8 is a fragmentary sectional view taken along the line 8—8 of Fig. 7;

Fig. 9 is a fragmentary transverse sectional view of the parts shown in Fig. 8;

Fig. 10 is a rear view partly in section of the parts shown in Fig. 8;

Fig. 11 is an enlarged elevational view of the clutch shown in section in Fig. 10;

Fig. 12 is a fragmentary rear elevation partly in section of the cross-rail and one of the cross heads supported thereon;

Fig. 13 is a vertical sectional view taken along the lines 13—13 of Figs. 2 and 12;

Fig. 14 is a fragmentary plan view with certain parts shown in section along the line 14—14 of Fig. 15;

Fig. 15 is a fragmentary vertical sectional view taken along the line 15—15 of Fig. 14;

Fig. 16 is a diagram of the electrical connections.

Similar reference characters refer to similar parts throughout the several views of the drawings.

Figure 1:
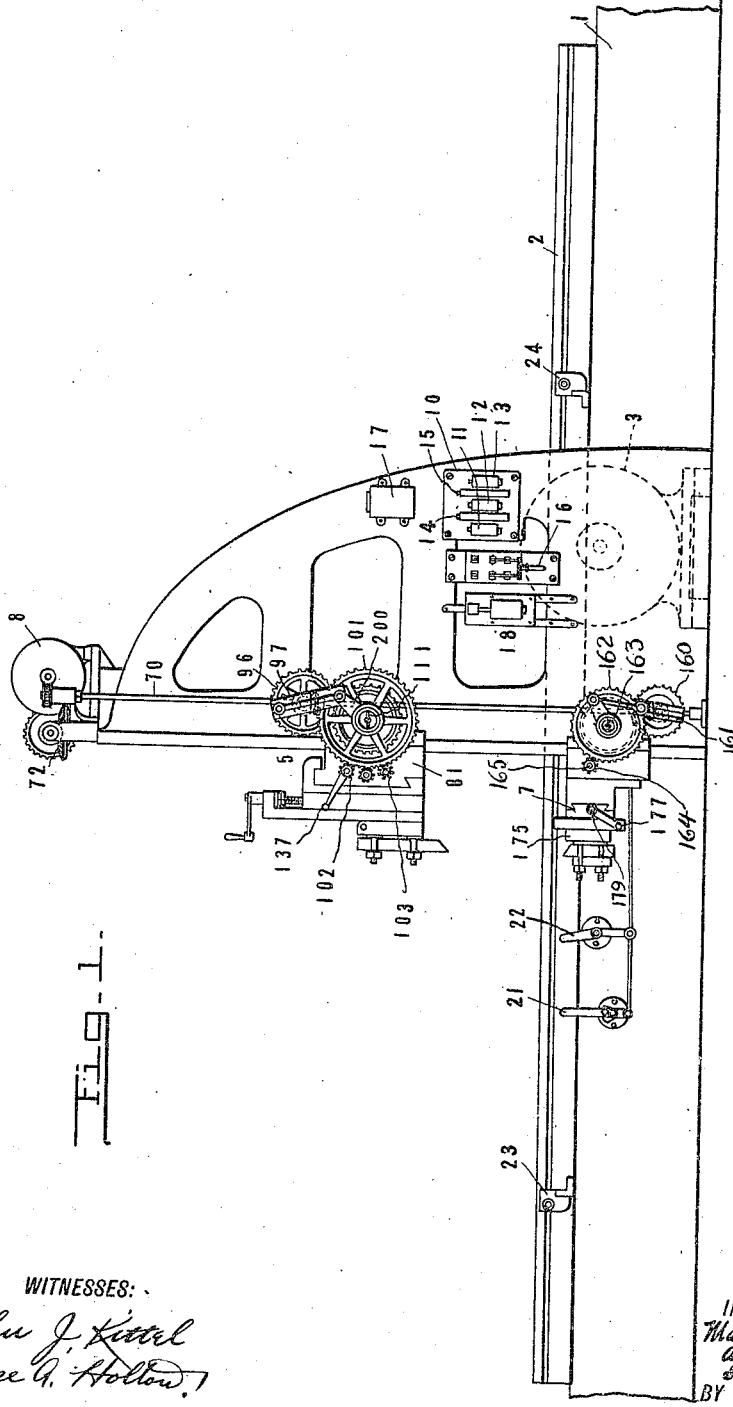
Figure 1 is a view in elevation of what may be termed for convenience the right side of a planer constructed in accordance with the present invention.

Referring now more particularly to Figs. 1 and 2, there is shown a planer comprising a bed 1, a table 2, mounted thereon and adapted to be reciprocated by a main electric motor 3, any suitable or well-known power-transmitting mechanism being interposed between the motor and the table. Preferably the motor is directly and positively connected with the table, and means are provided for reversing the motor periodically to effect the reciprocation of the table. The work which is to be planed is secured to the table 2 in the usual manner, and as the table reciprocates on the bed 1, the work is thereby carried past one or more relatively stationary tools mounted, respectively, on cross-rail heads 4, 5 and on side-heads 6, 7. The several tool carrying heads 4, 5, 6 and 7 are adjustable and suitable mechanism is provided for adjusting them either independently or in unison, as may be required. The tool heads must be preliminarily adjusted to bring the tools into operative relationship with the work; and, during normal operation, immediately after or immediately prior to each cutting stroke the four tools, or a lesser number if four are not being used at the time, are fed suitable distances equal to the widths of the cuts which have been found most advantageous for the particular work in hand. Thus, the normal operation of the planer requires means for starting and stopping the main motor and for reversing the same at the end of each stroke of the table, as well as for feeding each one of the tools between one cutting stroke and the next. The adjusting of the tools is accomplished, by a suitable power means or motor which is preferably electrically operated or controlled. As illustrated, there is a single electric tool adjusting motor 8 mounted, preferably, on the stationary arch 9 of the planer and so connected electrically with the control apparatus as to be rotated a predetermined number of revolutions between one cutting stroke and the next. The additional functions of the motor relating to the adjustments of the various tool-holding elements prior to the cutting operation will be hereinafter described in detail.

Considering now the electrical features of the apparatus, whereby the automatic reciprocation of the table and the feeding of the tools are accomplished, there is shown in Fig. 1 a main electromagnetic controlling mechanism 10. This mechanism comprises three switching devices 11, 12 and 13, and two relatively fixed blow-out magnets 14 and 15 placed respectively between the switching devices. There is also provided a double-pole double-throw transfer switch 16, a fuse box or other safety device 17 and an auxiliary switching device 18. In addition there is a feed-motor cut-out device 19, shown most clearly in Fig. 3, and a table operated controlling device in the form of a pilot-switch 20 shown in the diagrammatic Fig. 16. This switch is adapted to be operated by levers 21, 22, which are thrown either manually, as in the preliminary adjustments, or by adjustable dogs 23, 24 on the planer table, as in normal operation. The electrical connections between the two motors and the several elements of the control apparatus are shown in Fig. 16 and need not be separately enumerated in detail, as it is believed that a résumé of the sequence of operations will make the matter clear.

The pilot-switch 20 may have any one of several forms, but it is preferably composed of a rotatable drum 21' provided with two elongated and relatively insulated bars 22', 23'. Associated with the drum 21' and arranged concentrically therewith are six fixed contacts 24', 25, 26, 27, 28 and 29. When the drum 21' is in its neutral or off position, as shown in Fig. 16, the contact bars 22' and 23' are out of engagement with all of these fixed contacts. When, however, the drum 21' is rotated to its cutting position, either manually or by the engagement of the dog 24 with the lever 22, the bar 22' short-circuits the two cutting contacts 24', 25, while the bar 23' short-circuits the two middle contacts 26, 27. It is assumed at this time that the main and feed motors are both stationary, that power from an external source is available at a suitable constant voltage across the terminals marked respectively + and —, and that the double-pole, double-throw switch 16 is thrown upward. Now, with the pilot-switch in its cutting position, as above indicated, current will flow from the positive main at 30 to the lower contact 31 of the middle movable-core switching device 12, thence through the shunt field 32 of the main motor 3 to the negative main 33, this giving, as will be obvious, a maximum energization of the field magnets of the main motor. At the same time current flows from the positive main at 30, through the lowered movable contact 34 inside the stationary core of the right-hand blow-out magnet 15, thence through the coil 35 of the first switching device 11, through the contact 25, bar 22' and contact 24' of the pilot-switch to the negative main 33. The core 36 of the first switching device 11 at once rises, thereby completing a circuit from the positive main 30 through the coil 37 of the left blow-out magnet 14, through the lower auxiliary contact 38 of the third switch 13, thence through the core 39 of the said third switch, through the left blade of the double-pole double-throw switch 16, armature 40 of the main motor 3, main interpole 41 and extra interpole 42 of said motor, armature resistance 43, through the core 36 of the first switch 11 to the negative main 33. This comparatively weak current through the armature of the main motor, in conjunction with the strongly energized shunt field thereof, causes the motor to start in a direction corresponding to the cutting stroke of the planer table. As soon as the speeding up of the motor causes the voltage drop across its armature, interpoles and starting resistance to rise sufficiently, the winding 44 of the second switch 12, which is in shunt therewith, is sufficiently energized to lift the core 45 of this second switch, thereby short-circuiting at 46, 47, the starting resistance 43 and extra interpole 42 of the main motor. At the same time, by breaking the connection between the positive main and the lower movable contact 31 of said second switch, the switch 12, inserts into the shunt field circuit the desired portion of the cutting resistance 48 by virtue of the closed circuit from the positive main, at 30, through the coil 37 of the left blow-out magnet 14, lower auxiliary contact 38 of the third switch 13, lower fixed contact 49 of said third switch 13, through a portion of the cutting resistance 48 to the positive side of the shunt field 32 of the main motor. It will be obvious without further explanation that this results in a speeding up of the main motor, due both to the weakening of its shunt field and to the short-circuiting of its armature resistance. The main motor connections remain as indicated until the pilot-switch is rotated from its cutting position to its return position, either manually or by the engagement of the dog 23 with the lever 21. This breaks the circuit across the cutting contacts 24', 25 of the pilot-switch as well as across the middle contacts 26, 27, and almost instantaneously thereafter short-circuits the return contacts 28, 29, and reëstablishes the connection between the middle contacts 26, 27. During the rotation of the pilot-switch drum, however, the first and second switches 11, 12 drop their cores, thereby once more connecting the shunt field directly across the mains and causing the dynamic braking of the main motor by virtue of the closed circuit, including the armature 40, main interpole 41, extra interpole 42, starting resistance 43, core 36 of the first switch 11, lower auxiliary contact 50 thereof, coil 51 of the right-hand blow-out magnet 15, coil 37 of the left-hand blow-out magnet 14, lower auxiliary contact 38 of the third switch 13, core 59 thereof, thence through the left blade of the double-pole double-throw switch 16 to the opposite terminal of the armature 40. The blow-out magnets 14, 15 when sufficiently energized, draw up within them the lower movable contacts 52, 34, respectively, which open-circuit the coils of both the first switch 11 and the third switch 13, so that, even though the drum of the pilot-switch has attained its return position, the third switch 13 is not energized until the motor armature has practically stopped rotating. When this occurs the core 39 of the third switch 13 rises, thereby causing the main motor to start with the starting resistance 43 in the armature circuit and with the current through the armature in the reverse direction, so that the direction of movement of the planer table corresponds to its return stroke. As in the cutting stroke, the core of the second switch 12 rises as soon as the armature voltage has risen sufficiently, and as before, the rising of this core short-circuits the starting resistance 43 and weakens the shunt field; the circuit through the shunt field, however, is not now through the cutting resistance 48, but may be traced from the positive main at 30, through the coil 51 of the right-hand blow-out magnet 15, lower auxiliary contact 50 of the first switch 11, lower fixed contact 53 thereof, return resistance 54, shunt field 32, to the negative main 33. This enables the shunt field current to be maintained at a suitable value, weaker, however, on the return stroke, so that this stroke may be made at an appropriately higher speed than the cutting stroke.

So far no mention has been made of the operation of the feed motor 8, but it will be noted from Fig. 16 that the shunt field 55 of this motor is at all times energized by current from the mains 30 and 33, and that with the double-pole double-throw switch 16 in its upper or running position and the movable member 56 of the feed motor cut-out 19 in such a position as to connect the lower fixed contacts 57, 58 thereof, current will flow from the positive main 30 through the coil 59 of the auxiliary controller 18, through the right-hand blade of the double-pole double-throw switch 16, contact 57, movable member 56 and contact 58 of the feed-motor cut-out 19, the contact 25, bar 22' and contact 24' of the pilot-switch (assuming the pilot-switch in its cutting position), to the negative main 33. The rising of the core 60 of the auxiliary controller 18 resulting from this energization of the coil 59 completes a circuit from the positive main 30, through the coil 37 of the left-hand blow-out magnet 14, lower auxiliary contact 38 of the third switch 13, core 39 thereof, upper contact 61 of the auxiliary controller, core 60 thereof, to the right-hand brush of the feed-motor armature 62, thence through the armature to the left-hand brush, coil 63 of the blow-out magnet 64 of the auxiliary controller, core 36 of the first switch 11, to the negative main at 33. As a result the feed motor starts to rotate and continues its rotation until it has caused the vertical shaft 65 of the planer (see Fig. 3) to rotate through a definite predetermined angle which is preferably one-half a revolution. Thereupon the cam 66 fixed on this shaft shifts the movable member 56 of the feed-motor cut-out 19 from its lower position, indicated in Fig. 16, to its upper position, where it connects the upper fixed contacts 67, 68. As this shifting of the cut-out device open-circuits the coil 59 of the auxiliary controller 18, the core 60 thereof drops, thereby disconnecting the armature 62 from the source of power and short-circuiting said armature by virtue of the circuit comprising the armature 62, the core 60 of the auxiliary controller, the lower contact 61' thereof, and the braking resistance 43'. As a result the feed-motor acts as a generator and is quickly brought to rest. The feed-motor is not again rotated until the drum 21' of the pilot switch 20 has been shifted to its return position, which occurs, as previously stated, at the end of the cutting stroke. At this time the coil 59 of the auxiliary controller is energized by current passing through it from the positive main 30, through the right-hand blade of the double-pole double-throw switch 16, upper contact 67, movable member 56, and upper contact 68 of the feed-motor cut-out 19, contact 28, bar 23', and contact 29 of the pilot-switch 20, to the negative main. This, as before, connects the core 60 of the auxiliary controller to the upper contact 61 thereof and completes a circuit through the armature 62 of the feed motor, but it will be noticed that the current through the armature flows in the opposite direction, thus causing the rotation of the feed motor in the opposite direction. As in the case of the cutting stroke, the cut-out 19 effects the dynamic braking of the feed-motor after the vertical shaft 65 driven thereby has rotated through a definite predetermined angle, preferably one-half a revolution.

It will be noted that the construction is such that the starting of the feed-motor is effected by the same switches 11 and 13 which also start the main motor. As already stated, the energization of the switches 11 and 13 is dependent upon the closing of the switches 34 and 52 which are held open so long as any considerable current flows in the short circuit of the main motor. In this way the feed motor is prevented from starting until the speed of the main motor drops to a predetermined point, the operation of the feed-motor being thus dependent upon the speed of the main motor.

The above comprises an outline of the sequence of events occurring during the normal operation of the planer. Now, in order that the feed-motor 8 may be used for making one or more of the adjustments usually necessary prior to the actual cutting operation, the double-pole double-throw switch 16 is shifted to its lower position as in Fig. 1. As will be obvious from an inspection of the wiring diagram in Fig. 16, this open-circuits completely the armature of the main motor and connects the coil 59 of the auxiliary controller permanently across the mains, so that with the pilot-switch drum in either its cutting or return position, the feed-motor will now run indefinitely in one direction or the other, its field, as during the normal operation of the planer, being permanently connected across the mains.

The preliminary adjustments, then, are conveniently accomplished by keeping the double-pole double-throw transfer switch 16 in its lower position and shifting the drum 21 of the pilot-switch to and from its cutting, neutral and return positions by operating manually one or the other of the levers 21, 22.

It will be seen that the transfer switch serves when in one position to render the main switch mechanism inoperative to control and reverse the drive motor, thereby placing the tool adjusting motor under independent manual control. In the embodiment of the invention illustrated, this independent manual control is effected by the same switch mechanism which normally serves to control the main motor, and in this way it is possible to make use of a single controlling mechanism to effect the control of both motors. When the tool adjusting motor is adapted to effect the normal feeding movements of the tools, the transfer switch serves in one position to place the main motor under the control of the controlling mechanism and to connect the feed-motor for automatic operation; and it serves when in its other position to place the feed-motor alone under the control of the controlling mechanism. Preferably, as illustrated, the feed-motor is also under the control of the controlling mechanism when the transfer switch is in its first position, but as to this there can be variation.

Certain of the electrical features above noted are the invention of Willard T. Sears in collaboration with Samuel H. Keefer, one of the present inventors, as set forth in their Patent No. 996,529, granted June 27, 1911, reissued May 1st, 1917, Reissue No. 14,296.

Taking up the mechanical features of the invention for detailed consideration, it will be noted that the power means or motor for feeding the tools is shown as suitably mounted on the stationary arch 9 of the planer with the shaft 69 of the motor arranged horizontally, transverse to the plane of reciprocation of the table 2. The vertical shaft 65 hereinbefore described as causing the operation of the cam 66 of the feed-motor cut-out 19, and a counterpart 70 of this shaft on the other side of the planer are rotated directly from the motor shaft 69 through worm and wheel connections 71, 72, so that whenever the feed-motor is rotating, both vertical shafts 65, 70, are in motion.

Neglecting for the moment the various devices actuated by the rotation of these vertical shafts 65, 70, there is shown at 73 a pinion loosely mounted on the motor-shaft 69. The pinion 73 is connected preferably through an idler 74 to a gear 75 on a horizontal shaft 76 parallel to the shaft 69. By means of bevel gearing at 77 and 78 the shaft 76 drives vertical elevating screws 79 and 80. These screws support the cross-rail 81 and when the screws are turned the cross-rail is raised or lowered. When such adjustment of the cross-rail is to be made, the pinion 73 is operatively connected with the feed-motor shaft 69 by means of a toothed clutch 82 comprising a splined tooth collar 87. This collar is provided at 91 with an annular groove into which extends oppositely disposed pins on a forked yoke 92. The yoke is carried by a lever 89 pivoted at 90. By means of a link 86 the lever 89 is connected with a lever 84 which is provided at its lower end with a handle 83 and which is adapted to be fastened by means of a suitable latch device at 85. To connect the pinion 73 with the shaft 69 the operator pulls outward on the handle 83, thus moving the clutch collar 87 toward the right as viewed in Figs. 4, 5 and 6 and engaging the teeth thereof with similar teeth formed on the hub of the pinion. When the cross-rail is to be raised or lowered, the transfer switch 16 is thrown to its lower position and the clutch 82 is engaged by pulling the handle 83 upward. The operator then operates the motor 8 in one direction or the other to raise or lower the rail, this operation in the present case being effected by manually moving the levers 21 and 22. When the cross-rail has been moved to its proper vertical position the handle 83 is again latched to the frame of the planer so that further rotation of the feed-motor 8 will have no effect upon the elevating screws 79, 80 of the cross-rail.

Now that the cross-rail has been adjusted, the feed motor 8 is used to effect the power traverse of the two cross-rail heads 4 and 5 through mechanism located at one side or the other of the cross-rail and movable therewith, a preferred form of this mechanism being constructed as follows:

Splined to the vertical shaft 70 driven as above noted from the feed-motor shaft 69 through the worm gearing 72 is a horizontal bevel gear 93 meshing with a vertical bevel gear 94 having preferably the same number of teeth. The gear 94 is keyed to a horizontal intermediate shaft 95 carrying two power transmitting devices, namely, a gear 96 used in the preliminary adjustments of the planer and a feed plate or crank arm 97 used to advance the cross-rail heads the desired amount during each of the cycles of cutting operations.

Considering now simply the preliminary adjustments of the cross-rail heads, it is preferable that the rotation of the feed-motor 8 should cause continuous movement in one direction or the other of the particular cross-rail head which is being moved to its cutting position. To this end the gear 96 on the intermediate shaft 95 rotates a gear 98 mounted loosely about a fixed stud 99, and the latter gear through a clutch device 100 causes the continuous rotation of a large drive gear 101. By means of double ratchet gears 102, 103 and horizontal screw-threaded shafts 104, 105 transverse movements of the respective cross-rail heads 4, 5 are caused. The clutch device 100, which is shown in detail in Figs. 10 and 11, comprises in the present instance a clutch collar 107 splined at 110 in a central recess in the hub of the gear 101. This clutch collar has at one end teeth 109 adapted to mesh with similar teeth 106 on the gear 98, and at the other end the collar has teeth 108 adapted to mesh with similar teeth 202 on the hub 201 of a lever 200, which will be again referred to. The clutch collar 107 is movable axially by means of a handle 111 which is secured to a rod 112 slidable in a central aperture in the stud 99. The rod 112 carries a transverse pin 113 which extends through slots 114 and 115 in the stud and the ends of which project into an annular space 116 in the clutch collar 107. Considering now simply the set of teeth 109 at the right hand side of this dog 107, it will be obvious that a movement inward (to the right in Figs. 10 and 11) of the handle 111 will cause the teeth 109 on the collar 107 to mesh with the teeth 106 on the gear 98 so that with the clutch 100 in this position the continuous rotation of the feed-motor 8 will cause, through the gears 96 and 98, the clutch 100 and the large gear 101, the continuous rotation of the double-ratchet gears 102, 103. These gears, which are substantially identical, comprise each an annular member 117 (Figs. 8 and 9) provided on its outer surface with teeth 118 adapted to engage continuously the teeth 119 of the large gear 101 and on a portion or all of its inner face with notches forming two oppositely disposed ratchets 120, 121. Mounted concentrically within this annular member 117 is a second member 122 prevented from longitudinal movement with respect to the annular member 117 by means of the screw 123 extending into the annular recess 124 of the second member 122. The member 122 is provided at 125 with a squared opening to receive the squared end of any shaft on which this device (termed for convenience a "click box") may be placed. The second member 122 carries also a double-ended pawl 126 pivoted at 127 and adapted to be rotated a portion of a revolution one way or the other from its neutral position (shown in Figs. 7 and 9) so as to cause one end or the other of said pawl to engage one or the other of the two oppositely extending sets of ratchet teeth 120, 121 of the annular member 117. From this it will be clear that if say the right-hand end (Figs. 7 and 9) of the pawl 126 is turned upward so as to engage the set 120 of ratchet teeth within the annular member 117, the rotation counter-clockwise of the annular member will impart a like rotation to the second member 122 and to the shaft on which the latter is for the time being mounted; while a clockwise rotation of the annular member 117 will cause no rotation whatever of said shaft, the right-hand end of the pawl at this time slipping idly over both sets of ratchet teeth 120, 121. In a similar manner the squared shaft may be given a clockwise rotation while the annular member rotates clockwise and no rotation at all when the latter is moving in the opposite direction. The pawl is oscillated by means of a handle 128 fixed to or integral with the pawl 126, and is preferably held in either of its three positions by means of a latch comprising the leaf spring 129 secured as at 130 to the second member 122 and notched and beveled as at 131, 132, to coöperate with a suitably shaped member 133 movable with the pawl 126.

A suitable nut 134 secured to the left-hand cross-rail head 4 serves to transmit the rotary motion of the upper traverse screw 104 to the cross-rail head 4, and a nut 135 is provided on the right-hand head 5 to transmit motion from the lower traverse screw 105 to said head. From this it will be clear that by slipping a click box on the squared end of the traverse screw 104 for the left cross-rail head 4 the continuous rotation of the feed-motor 8 in one direction may be made to effect the movement to the left of the left cross-rail head, or the rotation of the feed-motor in the opposite direction may be utilized for moving the cross-rail head to the right, or the latch of the click box may be manipulated in such a way that the cross-rail head is not moved at all. A second click box if slipped onto the squared end of the other traverse screw 105 serves to move the right-hand cross-rail head 5 to the left or right as may be necessary, to adjust the tool carried thereby, and it will be clear, furthermore, that while the feed-motor is rotating in one direction both cross-rail heads may be moved to the right, for instance, or one or both may be stationary, and likewise with a reverse rotation of the feed-motor both cross-rail heads may be moved to the left or one or both may be stationary, the various adjustments being effected by means of the latches of the respective click boxes.

As soon as the two cross-rail heads 4, 5 have been moved to their proper transverse position, the latches on the two click-boxes 102, 103, are both turned to neutral position so that rotation of the large gear 101 will not cause the movement of either cross-rail head. The tool heads 4 and 5 are provided respectively with angularly movable swivel plates 4ª and 5ª on which are respectively mounted slides 136 and 137. These slides carry the cutting tools as shown in Fig. 1 and are normally movable vertically, but it will be understood that the direction of movement can be adjusted angularly by turning the respective swivel plates 4ª and 5ª.

For effecting vertical movement of each slide there is provided a suitable mechanism such as is shown in detail in Figs. 12 and 13. There is provided a horizontal shaft 138 rotatably mounted on the cross-rail and positioned approximately midway between the screws 104 and 105. For each cross head the horizontal shaft 138 has splined upon it a sleeve 139 which carries a bevel gear 140. This bevel gear meshes with a second bevel gear 141 secured to a horizontal shaft 144 which is rotatably mounted in the body part of the cross head with its axis coincident with the axis of movement of the corresponding swivel plate. The sleeves 139 are longitudinally slidable respectively in brackets carried respectively by the cross head, and are longitudinally movable in the brackets under the control respectively of bellcrank levers 142 and 150 pivoted to the respective cross heads as indicated at 143. By means of these levers the sleeves can be moved to bring the respective gears 140 into or out of mesh with the gears 141.

The slide 137 carries a longitudinally threaded rod 147 which extends through a nut 147ª carried by the swivel plate 5ª. Splined upon the rod 147 is a bevel gear 146 which meshes with a similar bevel gear 145 secured to the aforesaid shaft 144.

When the shaft 138 is turned, motion may be transmitted to either or both of the threaded rods 147, and these rods, because of their engagement with the nuts 147ª, will serve respectively to raise or lower the slides 136 and 137 and the tools carried thereby. Inasmuch as each shaft 144 is mounted concentrically with the axis of movement of the corresponding swivel plate, the slide can be adjusted to any angle without disturbing the power connection.

When one or the other of the slides is to be moved by power, it is connected with the shaft 138 by moving the proper lever 142 or 150 and by putting a click-box in place on the end of the shaft. This click-box engages the aforesaid gear wheel 101 and may be adjusted to turn the shaft 138 in either direction.

If the planer is equipped with one or more side heads such as those indicated at 6, 7, the feed-motor 8 may be utilized to raise or lower either of them independently of the other so that they will be in the proper position to have their respective tools operate on the work as soon as the table 2 is reciprocated by the main motor 3. To this end there is provided on each side head a mechanism somewhat smaller but otherwise similar to that used for the cross-rail heads. Each mechanism comprises a bevel gear 157 splined to the corresponding vertical shaft 65 or 70. Arranged in permanent driving engagement with the gear 157 is a bevel gear 158 keyed to a horizontal intermediate shaft 159 which carries two devices, namely, a gear 160 and a feed-plate or crank arm 161. Either the gear 160 or the feed-plate 161 may be used to rotate a large gear 162 according to the position of a longitudinally movable clutch controllable by a handle 163. The clutch is placed in its inner position to connect the shaft with the gear 160 when it is desired to rotate the gear 162 continuously, as is desirable for effecting preliminary adjustment. The clutch is placed in its outer position to connect the feed-plate 161 with the shaft when it is desired to oscillate the gear 162. This large gear 162 drives the annular member of a double-ratchet gear 164 similar in every respect to those driven by the large gear 101 of the mechanism attached to the cross-rail. The double-ratchet gear 164 is removably mounted on the squared end of a horizontal shaft 165. Secured to the shaft 165 is a bevel gear 160 which meshes with a bevel gear 167 on a short vertical shaft 169. Connected with the gear 167 is a spur gear 168 which meshes with an idler spur gear 170, this idler gear in turn meshing with a spur gear 171 splined on a vertical threaded shaft 172. This shaft has threaded engagement with a part of the body of the side-head which serves as a nut, as indicated at 173. It will be seen that by turning the shaft 165 either manually or by means of the mechanism described, the threaded shaft 172 may be turned to raise or lower the side-head.

The side-heads 6 and 7 are provided respectively with tool-slides 174 and 175. These are adjusted respectively by means of transverse screws 178 and 179 which are manually rotatable respectively by means of cranks 176 and 177.

It will be understood that for all of the preliminary tool adjustments which have been described, the transfer switch 16 is maintained in its lower position, the feed-motor 8 being operated in one direction or the other as required by manually moving the levers 21 and 22.

If, for any reason, it is desirable to effect the traverse of the cross-rail heads manually, this may be accomplished by means of a hand wrench slipped onto the squared ends of the respective cross-rail head traversing screws 104, 105. Similarly the tool-slides of these heads may be elevated by hand wrenches applied to the squared ends of the elevating screws 147 thereof, and the side-heads as a whole may be elevated by wrenches applied to the squared ends of the horizontal shafts 165. Preferably the side-heads are provided with suitable counterweights as at 181, 182 although these counterweights may be dispensed with.

From the foregoing description it will be clear that by means of the motor 8 any desired preliminary adjustment can be made of the cross-rail as a whole, of either or both of the cross heads with respect to the cross-rail, of either or both of the tool-slides with respect to the cross heads or of either or both of the side-heads. When the tools have been preliminarily adjusted to bring them into proper relationship to the work to be planed, the parts of the mechanism are then adjusted for feeding the tools through proper distances at each reciprocation of the table 2.

When the tools are to be automatically fed by means of the motor, the transfer switch 16 is thrown to its upper position, thus connecting the feed-motor to be automatically controlled and started, preferably simultaneously with the main motor. For feeding one or both of the cross heads transversely or for feeding one or both of the slides on the cross heads, the clutch 100 is adjusted to its left-hand position by means of the handle 111, thus connecting the gear 101 with the lever 200. As already described, the feed-plate or crank arm 97 is secured to the rotatable shaft 95 and this crank arm is provided with the central longitudinal slot 189. Positioned in the slot 189 is a screw-threaded adjusting member 190 terminating in knurled knobs 191, 192 or other suitable means whereby the screw may be readily rotated to the desired extent and securely held in its adjusted position. Slidably mounted in this slot 189 and provided with a nut 193 engaging the adjusting screw 190 is a pin 194. Upon the pin 194 is pivotally mounted a connecting rod 195, suitable means such as a shoulder 196, washer 197 and retaining nut 198 being provided to retain the connecting rod on the pin without binding. The connecting rod is pivotally connected at its opposite end 199 to the aforesaid lever 200. When the crank arm 97 is rotated the connecting rod 195 will serve to oscillate the lever 200, the extent of oscillation being adjustable by turning the screw 190 and thus moving the crank pin 194 outward or inward. Inasmuch as the lever 200 is connected with the gear 101, this gear is similarly oscillated. Inasmuch as the electrical connections are so designed as to cause the feed-motor cut-out 19 to stop the feed-motor after the vertical shafts 65, 70 driven thereby have rotated through a definite angle, as for instance one-half a revolution, it will be clear that by virtue of the unity gear ratio between said vertical shaft 70 and the intermediate shaft 95, the feed-motor will at the beginning of each cutting stroke of the planer rotate the crank arm 97 through one-half a revolution, and will at the beginning of each return stroke rotate the crank arm through one-half a revolution in the opposite direction. For each half-revolution of the crank arm 97 the gear 101 will be turned through a definite angle, the size of the angle being adjustable by means of the screw 190 and the nut 193. By virtue of the double-ratchet gears 102, 103 the tools carried on the cross-rail heads 4, 5 may be moved in one direction at the beginning of one stroke of the planer table, but will remain stationary at the beginning of the other stroke. It will be obvious that the direction of movement of the tools carried by the cross-rail heads may be similar or opposite, or, if only one tool is being used, the latch associated with the idle head 4 or 5, may be moved to neutral position and the oscillation of the large gear 101 will then cause simply the horizontal feed in the desired direction of the tool carried by the other head. The amplitude of feed may be adjusted to a high degree of precision by manipulating the knobs 191, 192 thereby varying the eccentricity of the pin 194 to which the connecting rod 195 is rotatably secured. If one or the other of the tools is to be fed upward or downward by means of the corresponding slide 136 or 137, this is effected by properly adjusting the click-box on the shaft 138 and by properly positioning the levers 142 and 150.

In like manner the feed-plates 161, carried respectively by the side heads 6, 7, may be utilized to effect vertical movements of either or both of the side heads through the driving connections from the feed-motor, as hereinbefore described.

It will be noted that if a tool is to be fed in one direction, this is done at, for instance, the beginning of the cutting stroke, while if the tool is to be fed in the opposite direction its feeding movement will take place at the beginning of the return stroke. In the latter event the objection may be raised that the tool would drag over the work during the return stroke. This dragging action does in fact occur, but its effect is not noticeably deleterious except when a finishing cut is being made and in such case the tool may be held away from the work during the return stroke either manually or by known mechanism comprising in itself no part of the present invention.

The sequence of events during the cutting operations may be summarized as follows: Assuming the planer table to be at the end of its cutting stroke, the pilot-switch 20 to be in its neutral position and the double-pole double-throw switch 16 to be thrown upward, the pilot-switch drum 21' may be rotated manually by the levers 21 or 22 to its return position, whereupon both the main motor 3 and the feed motor 8 will begin to rotate. The rotation of the main motor, accelerated upon the rising of the core 45 of the second switch 12, causes the planer table 2 to carry the work idly past as many of the four tools as are in use at the time. The feed-motor 8 rotates the vertical shafts 65, 70, thereby rotating the large gears 101 and 162 in one direction and feeding as many of the tools as are moved by their respective double-ratchet gears during a rotation of the large gears, in that direction. When the vertical shafts 65, 70 have completed one-half revolution the feed-motor is disconnected from the source of power and is promptly braked dynamically through the action of the feed-motor cut-out 19 and the auxiliary controller 18 and for the remainder of the return stroke the tools are stationary. At the end of the return stroke the adjustable dog 24 on the planer carriage shifts the pilot-switch 20 over to its cutting position, which accomplishes two functions: first, the main motor 3 is brought quickly to a stop and then started in the reverse direction, and, second, the feed-motor 8 is caused to rotate in a direction opposite to its direction of rotation at the beginning of the return stroke. As the planer table 2 moves on its cutting stroke and before the work has reached any of the tools, the rotation of the large gears 101 and 162, in the opposite direction to that indicated above effects through the respective double-ratchet gears the feeding movement of the tools which were not fed at the beginning of the return stroke. As before, the feed-motor is brought to a stop as soon as the vertical shafts and the feed plates have completed one-half revolution; so that as the work is carried past the tools they make the desired width and depth of cut throughout the cutting movement of the table. Then the main motor is braked and reversed, the feed-motor is again set in rotation and the cycle of operations is repeated.

Throughout the above description the terms such as "raising" and "lowering", "left" and "right", "cutting" and "return", "horizontal" and "vertical" have been selected as a matter of convenience only, as it is obvious that in most cases these expressions are used in a relative sense.

It will thus be seen that there is provided apparatus in which the several objects of this invention are achieved and the above and other advantages obtained.

Having described our invention, what we claim as new and desire to secure by Letters Patent is:

1. In a machine of the class described, the combination of a movable tool head, a power means, and power transmission mechanism connected with the power means and comprising devices for moving the tool head at a speed which is fixedly related to that of the power means and other devices for moving the tool head at a speed which is optionally variable with relation to the speed of the power means, the said power transmission means being bodily movable vertically.

2. In a machine of the class described, the combination of a vertically movable cross-rail, a tool head movable horizontally on the cross-rail, a power means, and power transmission mechanism connected with the power means and comprising devices for moving the tool head at a speed which is fixedly related to that of the power means and other devices for moving the tool head at a speed which is optionally variable with relation to the speed of the power means, the said power transmission means being carried by the cross-rail device and bodily movable therewith.

3. In a machine of the class described, the combination of a movable tool head, a power means, and power transmission mechanism connected with the power means and bodily movable vertically, the said power transmission mechanism comprising two sets of devices for moving the tool head, the devices of one set being adapted to move the tool head intermittently and the devices of the other set being adapted to move the tool head continuously.

4. In a machine of the class described, the combination of a vertically movable cross-rail, a tool head movable horizontally on the cross-rail, a power means, and power transmission mechanism connected with the power means and carried by the cross-rail to be bodily movable therewith, the said power transmission mechanism comprising two sets of devices for moving the tool head, the devices of one set being adapted to move the tool head intermittently and the devices of the other set being adapted to move the tool head continuously.

5. In a machine of the class described, the combination of a movable tool head, a power means, and power transmission mechanism between the power means and the tool head comprising a shaft rotatable with the power means, a gear on the shaft for transmitting continuous movement to the tool head, a crank arm on the shaft for transmitting intermittent movements to the tool head and means for causing either the gear or the crank arm to be operative.

6. In a machine of the class described, the combination of a movable tool head, a power means, and power transmission mechanism between the power means and the tool head comprising a shaft rotatable with the power means, a gear on the shaft for transmitting continuous movement to the tool head, an adjustable crank arm on the shaft for transmitting adjustable intermittent movements to the tool head and means for causing either the gear or the crank arm to be operative.

7. In a machine of the class described, the combination of a movable tool head, a power means, and power transmission mechanism between the power means and the tool head comprising a drive gear, a double ratchet device between the drive gear and the tool head, an intermediate gear and a lever both movable about the axis of the drive gear, a clutch for connecting either the intermediate gear or the lever to the drive gear, a shaft driven by the power means, a gear on the shaft meshing with the intermediate gear and a crank arm on the shaft connected with the lever to oscillate it.

8. In a machine of the class described the combination of a movable tool head, an electric motor, power transmission mechanism connected with the motor and bodily movable vertically, the said power transmission mechanism comprising two sets of devices for moving the tool head, the devices of one set being adapted to move the tool head intermittently and the devices of the other set being adapted to move the tool head continuously, and means for stopping the motor after rotation to a predetermined extent.

9. In a machine of the class described, the combination of a vertically movable cross-rail, a tool head movable horizontally on the cross-rail, an electric motor power transmission mechanism connected with the motor and carried by the cross-rail to be bodily movable therewith, the said power transmission mechanism comprising two sets of devices for moving the tool head, the devices of one set being adapted to move the tool head intermittently and the devices of the other set being adapted to move the tool head continuously, and means for stopping the motor after rotation to a predetermined extent.

10. In a machine of the class described, the combination of a vertically movable cross-rail, a cutting tool adjustable relatively to the cross-rail, a motor, and power transmission mechanism including means for optionally connecting the motor either with the cross-rail to move it vertically or with the tool to move it, the said mechanism comprising two sets of devices for moving the tool, the devices of one set being adapted to move the tool intermittently and the devices of the other set being adapted to move the tool continuously.

11. In a machine of the class described, the combination of a vertically movable cross-rail, a cutting tool adjustable relatively to the cross-rail, an electric motor, power transmission mechanism including means for optionally connecting the motor either with the cross-rail to move it vertically or with the tool to move it, the said mechanism comprising two sets of devices for moving the tool, the devices of one set being adapted to move the tool intermittently and the devices of the other set being adapted to move the tool continuously, a switch for automatically stopping the motor after rotation to a predetermined extent, whereby the tool may be moved to a predetermined extent, and means for rendering the motor stopping switch ineffective whereby either the cross-rail or the tool may be moved continuously to any desired extent.

12. Apparatus of the character described comprising, in combination, a motor, a cross rail, a head thereon, means whereby said motor may effect the raising and lowering of the cross-rail as well as the traverse of the head, and means actuated by said first named means for cutting off the supply of power to said motor at predetermined times.

13. Apparatus of the character described, comprising, in combination, a motor, a cross-rail, a head thereon, means whereby said motor may effect the raising and lowering of the cross-rail as well as the traverse of the head, means associated with said first means adapted at predetermined times in the operation of the same to cut off the supply of power to said motor, and means for rendering said second means ineffective in order that power may be supplied continuously to said motor.

14. Apparatus of the character described comprising, in combination, a motor, a cross-rail, a side-head, means whereby said motor may effect the raising and lowering of the cross-rail as well as the raising and lowering of the side-head, and means actuated by said first named means for cutting off the supply of power to said motor at predetermined times.

15. Apparatus of the character described, comprising, in combination, a motor, a cross-rail, a side-head, means whereby said motor may effect the raising and lowering of the cross-rail as well as the raising and lowering of the side-head, means associated with said first means adapted at predetermined times in the operation of the same to cut off the supply of power to said motor, and means for rendering said second means ineffective in order that power may be supplied continuously to said motor.

16. Apparatus of the character described, comprising, in combination, a motor, a cross-rail, a head thereon, a side-head, means whereby said motor may effect the elevation of said cross-rail, the traverse of said cross-rail head and the elevation of said side-head, and means associated with said first means adapted at predetermined times in the operation of the same to cut off the supply of power to said motor.

17. Apparatus of the character described, comprising, in combination, a motor, a cross-rail, a head thereon, a side-head, means whereby said motor effects the elevation of said cross-rail, the traverse of said cross-rail head and the elevation of said side-head, means associated with said first means adapted at predetermined times in the operation of the same to cut off the supply of power to said motor, and means for rendering said second means ineffective in order that power may be supplied continuously to said motor.

18. In a planer or other machine having a regularly reciprocating table and an adjustable tool, the combination with the table and the tool, of a tool feeding motor, a device normally operated by the table to start the motor at regular intervals as the table reciprocates, a motor operated device normally serving to stop the motor after movement to a predetermined extent, and a device independent of the said table operated device adapted to render the motor stopping device ineffective whereby the motor is controllable entirely independently thereof.

19. In a planer or other machine having a regularly reciprocating table, a vertically movable cross-rail and a tool adjustable relatively to the cross-rail, the combination with the table, the cross-rail and the tool, of a motor, means for optionally connecting the motor either with the cross-rail to move it vertically or with the tool to adjust it, a device normally operated by the table to start the motor at regular intervals as the table reciprocates, a motor operated device normally serving to stop the motor after movement to a predetermined extent, and a device adapted to render the motor stopping device ineffective whereby the motor is controllable entirely independently thereof.

20. In a planer or other machine having a regularly reciprocating table and an adjustable tool, the combination with the table and the tool, of a tool feeding motor, a device normally operated by the table to start the motor alternately in opposite directions at regular intervals as the table reciprocates, a motor operated device normally serving to stop the motor after movement to a predetermined extent, and a device adapted to render the motor stopping device ineffective whereby the motor is controllable entirely independently thereof.

21. In a planer or other machine having a regularly reciprocating table and an adjustable tool, the combination with the table and the tool, of a tool feeding motor, a controlling device manually operable independently of the table but normally operated thereby to start the motor at regular intervals as the table reciprocates, a motor operated device normally serving to stop the motor after movement to a predetermined extent, and a device adapted to render the motor stopping device ineffective whereby the motor is placed entirely under the control of the controlling device.

22. In a planer or other machine having a regularly reciprocating table, a vertically movable cross-rail and a tool adjustable relatively to the cross-rail, the combination with the table, the cross-rail and the tool, of an electric motor, means for optionally connecting the motor either with the cross-rail to move it vertically or with the tool to adjust it, a switch normally operated by the table to start the motor at regular intervals as the table reciprocates, a motor operated switch normally serving to stop the motor after rotation to a predetermined extent, and means adapted to render the motor stopping switch ineffective whereby the motor is controllable entirely independently thereof.

23. In a planer or other machine having a regularly reciprocating table and an adjustable tool, the combination with the table and the tool, of an electric tool feeding motor, a controlling switch manually operable independently of the table but normally operated thereby to start the motor at regular intervals as the table reciprocates, a motor operated switch normally serving to stop the motor after rotation to a predetermined extent, and means adapted to render the motor stopping switch ineffective whereby the motor is placed entirely under the control of the controlling switch.

24. In a planer or other machine having a regularly reciprocating table and an adjustable tool, the combination with the table and the tool, of an electric tool feeding motor, a relay switch for closing and opening the motor circuit, a pilot-switch normally operated by the table to close the relay circuit and thereby start the motor at regular intervals as the table reciprocates, a motor operated switch normally serving to open the relay circuit and thereby stop the motor after rotation to a predetermined extent, and a switch adapted to close the relay circuit independently of either of the aforesaid switches.

25. In a planer or other machine having a regularly reciprocating table and an adjustable tool, the combination with the table and the tool, of an electric tool feeding motor, a motor controlling circuit comprising two sections arranged in parallel, two switches each adapted to open one of the said circuit sections and close the other, one switch being operable by the table to alternately close the said circuit sections and thereby start the motor at regular intervals as the table reciprocates and the other switch being operable by the motor to alternately open the circuit sections and thereby stop the motor after rotation to a predetermined extent, and a normally open switch adapted when closed to establish a motor circuit independently of the motor stopping switch.

26. In a planer or other machine having a regularly reciprocating table and an adjustable tool, the combination with the table and the tool, of an electric tool feeding motor, a relay switch for closing and opening the motor circuit, a relay circuit comprising two sections arranged in parallel, and two switches each adapted to open one of the said circuit sections and close the other, one switch being operable by the table to alternately close the said circuit sections and thereby close the relay switch and start the motor at regular intervals as the table reciprocates and the other switch being operable by the motor to alternately open the circuit sections and thereby open the relay switch and stop the motor after rotation to a predetermined extent.

27. In a planer or other machine having a regularly reciprocating table and an adjustable tool, the combination with the table and the tool, of an electric tool feeding motor, a relay switch for closing and opening the motor circuit, a relay circuit comprising two sections arranged in parallel, two switches each adapted to open one of the said circuit sections and close the other, one switch being operable by the table to alternately close the said circuit sections and thereby close the relay switch and start the motor at regular intervals as the table reciprocates and the other switch being operable by the motor to alternately open the circuit sections and thereby open the relay switch and stop the motor after rotation to a predetermined extent, and a normally open switch adapted when closed to close the relay circuit independently of the motor operated switch.

28. In a planer or other machine having a regularly reciprocating table and an adjustable tool, the combination with the table and the tool, of an electric tool feeding motor, an electromagnetic motor-circuit controlling mechanism, a pilot-switch normally operated by the table and adapted to operate the controlling mechanism to start the motor at regular intervals as the table reciprocates, a switch operated by the motor and normally serving to stop the motor after rotation to a predetermined extent, and a switch adapted to render the motor stopping switch ineffective whereby the motor is placed entirely under the control of the controlling mechanism.

29. In a planer or other machine having a regularly reciprocating table and an adjustable tool, the combination with the table and the tool, of an electric tool feeding motor, two independent electromagnetic circuit controlling mechanisms connected in series in the motor circuit, a pilot-switch normally operated by the table and adapted to operate both of the controlling mechanisms to start the motor at regular intervals as the table reciprocates, and a switch operated by the motor and normally serving to operate one controlling mechanism to stop the motor after rotation to a predetermined extent.

30. In a planer or other machine having a regularly reciprocating table and an adjustable tool, the combination with the table and the tool, of an electric tool feeding motor, two independent electromagnetic circuit controlling mechanisms connected in series in the motor circuit, a pilot-switch normally operated by the table and adapted to operate both of the controlling mechanisms to start the motor at regular intervals as the table reciprocates, a switch operated by the motor and normally serving to operate one controlling mechanism to stop the motor after rotation to a predetermined extent, and a switch adapted to render the motor operated switch ineffective whereby the motor is placed entirely under the control of the other controlling mechanism.

31. In a planer or other machine having a regularly reciprocating table and an adjustable tool, the combination with the table and the tool, of a reversible table driving motor, an electric tool adjusting motor, a controlling switch mechanism manually operable independently of the table but normally operated thereby to control and reverse the drive motor and to start the tool adjusting motor at regular intervals as the table reciprocates, and a transfer switch adapted to render the switch mechanism inoperative to control and reverse the drive motor whereby the tool adjusting motor is placed under independent manual control.

32. In a planer or other machine having a regularly reciprocating table and an adjustable tool, the combination with the table and the tool, of a reversible table driving motor, a tool adjusting motor, mechanism for controlling and reversing the drive motor at intervals as the table reciprocates, and means for placing the tool adjusting motor under the control of the controlling and reversing means entirely independently of the drive motor.

33. In a planer or other machine having a regularly reciprocating table and an adjustable tool, the combination with the table and the tool, of a reversible table driving motor, an automatically operable tool feeding motor, mechanism for controlling and reversing the drive motor at intervals as the table reciprocates, and means for placing the feed-motor under the control of the controlling and reversing mechanism entirely independently of the drive motor.

34. In a planer or other machine having a regularly reciprocating table and an adjustable tool, the combination with the table and the tool, of a reversible table driving motor, an electric motor for adjusting the tool, electromagnetic switch mechanism for controlling and reversing the drive motor at intervals as the table reciprocates, and means for placing the tool adjusting motor under the control of the electromagnetic switch mechanism entirely independently of the drive motor.

35. In a planer or other machine having a regularly reciprocating table and an adjustable tool, the combination with the table and the tool, of a reversible table driving motor, an electric motor for adjusting the tool, electromagnetic switch mechanism for controlling and reversing the drive motor, a pilot-switch normally operated by the table and adapted to operate the electromagnetic switch mechanism at regular intervals as the table reciprocates, and means for placing the tool adjusting motor under the control of the electromagnetic switch mechanism entirely independently of the drive motor.

36. In a planer or other machine having a regularly reciprocating table and an adjustable tool, the combination with the table and the tool, of a reversible table driving motor, an electric tool adjusting motor, a switch mechanism normally operated by the table but adapted to be operated manually, and a transfer switch serving in one position to place both motors under the control of the switch mechanism to reverse the drive motor at regular intervals as the table reciprocates and serving in another position to place the tool adjusting motor under the control of the switch mechanism and to disconnect the drive motor therefrom.

37. In a planer or other machine having a regularly reciprocating table and an adjustable tool, the combination with the table and the tool, of a reversible electric motor for driving the table, a power device for feeding the tool, a controlling device normally operated by the table and adapted to reverse the drive motor and to start the feeding of the tool by the power device at regular intervals as the table reciprocates, means operated by the said power device and normally serving to stop the tool after movement to a predetermined extent, and means adapted to render the said tool stopping means ineffective whereby the power device is placed entirely under the control of the controlling device.

38. In a planer or other machine having a regularly reciprocating table and an adjustable tool, the combination with the table and the tool, of a reversible electric motor for driving the table, an electrically controlled power device for feeding the tool, a controlling switch normally operated by the table and adapted to reverse the drive motor and to start the feeding of the tool by the power device at regular intervals as the table reciprocates, a switch operated by the said power device and normally serving to stop the tool after movement to a predetermined extent, and means adapted to render the said tool stopping switch ineffective whereby the power device is placed entirely under the control of the controlling switch.

39. In a planer or other machine having a regularly reciprocating table and an adjustable tool, the combination with the table and the tool, of a reversible electric table driving motor, an electric tool feeding motor, a controlling device manually operable independently of the table but normally operated thereby to reverse the drive motor and start the feed-motor at regular intervals as the table reciprocates, a switch operated by the feed-motor and normally serving to stop the said motor after rotation to a predetermined extent, and means adapted to render the motor stopping switch ineffective whereby the feed motor is placed under the control of the controlling switch.

40. In a planer or other machine having a regularly reciprocating table and an adjustable tool, the combination with the table and the tool, of a reversible table driving motor, an electric tool adjusting motor, a controlling switch mechanism manually operable independently of the table but normally operated thereby to control and reverse the drive motor and to start the tool adjusting motor at regular intervals as the table reciprocates, a switch operated by the tool adjusting motor normally serving to stop the said motor after rotation to a predetermined extent, and a transfer switch adapted to render the switch mechanism inoperative to control and reverse the drive motor and to render the motor stopping switch inoperative whereby the tool adjusting motor is placed under independent manual control.

41. In a planer or other machine having a regularly reciprocating table and an adjustable tool, the combination with the table and the tool, of a reversible electric table driving motor, an electric tool feeding motor, a controlling device manually operable independently of the table but normally operated thereby to reverse the drive motor and start the feed motor at regular intervals as the table reciprocates, means operated by the feed motor and normally serving to stop the said motor after rotation to a predetermined extent, and means adapted to prevent the operation of the drive motor and to render the said motor stopping means ineffective whereby the feed-motor is placed entirely under the control of the controlling device independently of the drive motor.

42. In a planer or other machine having a regularly reciprocating table and an adjustable tool, the combination with the table and the tool, of a reversible electric table driving motor, an electric tool feeding motor, a controlling switch manually operable independently of the table but normally operated thereby to reverse the drive motor and start the feed-motor at regular intervals as the table reciprocates, a switch operated by the feed-motor and normally serving to stop the said motor after rotation to a predetermined extent, and a switch adapted to open the circuit of the drive motor and to render the feed-motor stopping switch ineffective whereby the feed-motor is placed entirely under the control of the said controlling switch independently of the drive motor.

43. In a planer or other machine having a regularly reciprocating table and an adjustable tool, the combination with the table and the tool, of a reversible electric motor for driving the table, an automatically operable electric motor for feeding the tool, an electromagnetic motor circuit controlling mechanism, a pilot-switch normally operated by the table and adapted to operate the controlling mechanism to reverse the drive motor at regular intervals as the table reciprocates, a switch operated by the feed-motor and normally serving to stop the said motor after rotation to a predetermined extent, and a switch adapted to render the said motor stopping switch ineffective and to place the feed motor entirely under the control of the controlling mechanism.

44. In a planer or other machine having a regularly reciprocating table and an adjustable tool, the combination with the table and the tool, of a reversible electric motor for driving the table, an electric motor for feeding the tool, an electromagnetic motor circuit controlling mechanism, a pilot-switch normally operated by the table and adapted to operate the controlling mechanism to reverse the drive motor and to start the feed-motor at regular intervals as the table reciprocates, a switch operated by the feed-motor and normally serving to stop the said motor after rotation to a predetermined extent, and a switch adapted to render the said motor stopping switch ineffective whereby the feed-motor is placed entirely under the control of the controlling mechanism.

45. In a planer or other machine having a regularly reciprocating table and an adjustable tool, the combination with the table and the tool, of a reversible electric motor for driving the table, an automatically operable electric motor for feeding the tool, an electromagnetic motor circuit controlling mechanism, a pilot-switch normally operated by the table and adapted to operate the controlling mechanism to reverse the drive motor at regular intervals as the table reciprocates, a switch operated by the feed-motor and normally serving to stop the said motor after rotation to a predetermined extent, and a switch adapted to prevent the operation of the drive motor and to render the feed-motor stopping switch ineffective and to place the feed-motor entirely under the control of the controlling mechanism independently of the drive motor.

46. In a planer or other machine having a regularly reciprocating table and an adjustable tool, the combination with the table and the tool, of a reversible electric motor for driving the table, an electric motor for feeding the tool, an electromagnetic motor circuit controlling mechanism, a pilot-switch normally operated by the table and adapted to operate the controlling mechanism to reverse the drive motor and to start the feed-motor at regular intervals as the table reciprocates, a switch operated by the feed-motor and normally serving to stop the said motor after rotation to a predetermined extent, and a switch adapted to prevent the operation of the drive motor and to render the feed-motor stopping switch ineffective whereby the feed-motor is placed entirely under the control of the controlling mechanism independently of the drive motor.

47. In a planer or other machine having a regularly reciprocating table and an adjustable tool, the combination with the table and the tool, of a reversible electric table driving motor, an electric tool feeding motor, an electromagnetic circuit controlling mechanism, a pilot-switch manually operable independently of the table but normally operated thereby and adapted to operate the controlling mechanism to reverse the drive motor and to start the feed-motor alternately in opposite directions at regular intervals as the table reciprocates, a switch operated by the feed-motor and normally serving to stop the said motor after rotation to a predetermined extent, and a switch adapted to prevent operation of the drive motor and to render the said motor stopping switch ineffective whereby the feed-motor is placed entirely under the control of the pilot-switch and the controlling mechanism.

48. In a planer or other machine having a regularly reciprocating table and an adjustable tool, the combination with the table and the tool, of a reversible electric table driving motor, an electric tool feeding motor, a motor reversing mechanism normally operated by the table to reverse the drive motor, means normally operated by the table to start the feed-motor at regular intervals as the table reciprocates, means operated by the feed-motor and normally serving to stop the said motor after rotation to a predetermined extent, and means adapted to prevent the operation of the drive motor and to render the said motor stopping means ineffective and to place the feed-motor entirely under the control of the reversing mechanism independently of the drive motor.

MAE A. KEEFER,
*Administratrix of Samuel H. Keefer, deceased.*
GEORGE E. GREENLEAF.

Witnesses:
HELEN L. DAVIS,
GEORGE E. VAN DYNE.